United States Patent [19]

Ishida et al.

[11] 4,376,519

[45] Mar. 15, 1983

[54] LUBRICANT SHEET FOR MAGNETIC TAPE CASSETTE

[75] Inventors: Toshihiko Ishida, Komoro; Hitoshi Azegami; Yoshio Kawakami, both of Toubu, all of Japan

[73] Assignee: TDK Electronics Co., Ltd., Tokyo, Japan

[21] Appl. No.: 271,867

[22] Filed: Jun. 9, 1981

Related U.S. Application Data

[62] Division of Ser. No. 146,848, May 5, 1980, abandoned.

[30] Foreign Application Priority Data

May 7, 1979 [JP] Japan ............................. 54-59602[U]

[51] Int. Cl.³ .......................... G03B 1/04; G11B 15/32
[52] U.S. Cl. .................................... 242/199; 242/197

[58] Field of Search ..................... 242/194, 197–200, 242/55.19 A; 360/93, 96, 132; 206/389; 428/447

[56] References Cited

U.S. PATENT DOCUMENTS 3,529,788 9/1970 Sasaki et al. ........................ 242/199
3,556,434 1/1971 Koeppe ............................... 242/199

Primary Examiner—Leonard D. Christian
Attorney, Agent, or Firm—Seidel, Gonda, Goldhammer & Panitch

[57] ABSTRACT

A lubricant sheet for a magnetic tape cassette characterized in that at least one side of a base incorporating an antistatic agent is provided with a release type silicone coating. This lubricant sheet combines the transparency derived from the use of the clear base and coating materials with the low friction characteristic and the antistatic property to suit the application as such for transparent tape cassette cases.

1 Claim, 2 Drawing Figures

LUBRICANT SHEET FOR MAGNETIC TAPE CASSETTE

This is a division of application Ser. No. 146,848 filed May 5, 1980 now abandoned.

TECHNICAL FIELD

This invention relates to a lubricant sheet for a magnetic tape cassette, and more specifically to one characterized in that a release type silicone coating is given to a base incorporating an antistatic agent.

BACKGROUND OF THE INVENTION

The magnetic tape cassette consists of upper and lower half cases formed of plastics and fastened together, and a length of magnetic tape wound on a pair of reels in the space within the complete case. As the tape passes from one reel to the other via an external tape head, its both edges tend to run in direct contact with the inner surfaces of the upper and lower half cases, producing such a high frictional resistance that the tape running becomes unsteady and instable. In order to avoid this, it has been customary to insert pieces of lubricant sheet between the tape reels and the inner surfaces of the half cases. The lubricant sheet, in contact with the tape reels, helps the tape to run smooth and stably, and also serves to prevent troubles such as objectionable loosening of the tape and choking of its passageway.

Recently, it has been proposed to make the upper and lower half cases of magnetic tape cassettes from transparent plastics so that the interior of the cassettes can be seen from the outside to permit the user easily to see how much part of the tape has been wound on or unwound from which reel and watch the running condition of the tape. In addition, the transparency gives a look refined in design to the containers. In order that the cassettes may be built transparently to make the tape reels visible from the outside, it is necessary that the case itself is made transparent and additionally the lubricant sheet, to be interposed between the inner surfaces of the case and the reels, should be transparent, too.

The clear lubricant sheet for such application is required to meet some essential requirements including, of course, the ability of giving a low coefficient of friction on contact with the tape reels running within the cassette, and also freeness from electrostatic charging, limited dimensional changes with temperature and humidity, and long service life without the possibility of abrasion or damage. Electrostatic charging is a problem particularly serious for the transparent sheet of clear plastics having a high surface resistivity. A statically charged lubricant sheet unfavorably affects the passage of the tape, increases the torque requirement, and reduces the tape life or frequency of usages. The sheet is charged also when it is stamped out or in transportation, and if some electric charge of the same polarity is built up in the case during the assembling the tape into the case, the combined charge can force the sheet out of place. In the mechanized assembly line, the lubricant sheet off the proper place is incorporated as it is into the assembly, resulting in a defective product. Also, the charge often causes the sheet to shift out of place while the tape is running. Experiments indicated that the percentage of shifting of the sheet out of normal place during assembling work was as high as 58% and that of troubles in running was 35%.

The transparent sheet is commercially available in a variety of kinds. However, from the viewpoints of friction coefficient and static chargeability, none of those are suitable for immediate use, without any additional processing or treatment. For example, polyesters have high surface resistivities of $10^{16}\Omega$·cm or upwards. In view of this, the present inventors have attempted at decreasing the coefficient of friction by applying a release type silicone coating to a transparent sheet of commerce as the base and also at preventing the electrostatic charging by giving an antistatic coating to the base. Thus, as the clear lubricant sheets designed to solve the both problems of high friction coefficient and static chargeability, varied lubricant sheets have been developed which consist of a transparent base of polyethylene terephthalate, polypropylene, polyethylene, polymethylene terephthalate, polycarbonate, cellophane, or styrol, provided with a release type silicone coating on one side and an antistatic coating on the other, or provided with a release type silicone coating that incorporates an antistatic agent on either side or both sides of the base.

It has, however, been found that even the lubricant sheets having the antistatic coating or silicone coating containing an antistatic agent presents other difficulties. Firstly, in the case of the lubricant sheet having the release type silicone coating on one side and the antistatic coating on the opposite, the two coatings both of which are transparent can hardly be distinguished from each other. The silicone coating must come to the side of the sheet that makes contact with the tape. Should it be erroneously replaced by the antistatically coated side during the course of assembling, the latter coating with a high coefficient of friction would invite a trouble of the running tape, making the lubricant sheet useless as such. Secondly, because the antistatic coating or antistat-containing layer is exposed to direct contact with the tape, the lubricant sheet will lose its antistatic effect as the antistatic agent wears off with about 30 passes of the tape. Moreover, the agent can evaporate completely during a heat-resistance test or on standing. Thirdly, incorporation of an antistatic agent into release type silicone lowers the good surface friction coefficient characteristic the silicone coating originally possesses and, furthermore, the proportion of the agent to be mixed with the silicone is limited because the coating layer is thin.

DISCLOSURE OF INVENTION

Figure 1:
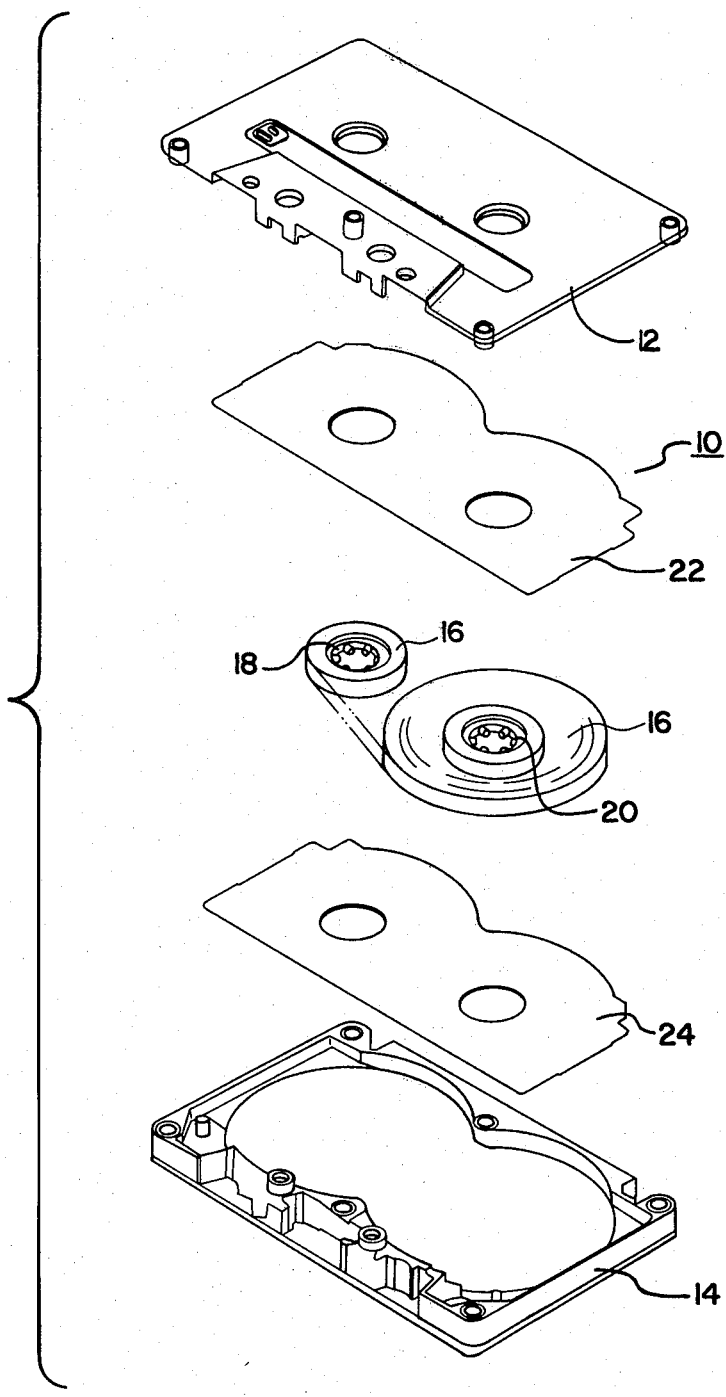
FIG. 1 shows an exploded isometric view of a magnetic tape cassette in accordance with this invention.
Figure 2:
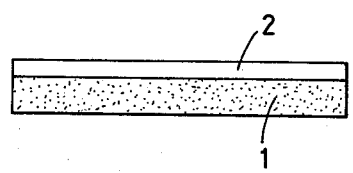
FIG. 2 shows a section of a lubricant sheet according to this invention.

With those drawbacks in view, the present inventors devised a lubricant sheet consisting of a base prepared by mixing itself with an antistatic agent and giving a release type silicone coating to at least one side of the base. Referring to FIG. 1, a magnetic tape cassette 10 is shown. The magnetic tape cassette 10 is composed of a transparent upper half-case 12 and a transparent lower half-case 14. Disposed between half-cases 12, 14 is a length of magnetic tape 16 wound on a pair of reels 18, 20. Disposed between respective half-cases 12, 14 and the magnetic tape 16 are lubricant sheets 22, 24. Referring to FIG. 2, the numeral 1 indicates a base incorporating an antistatic agent, and 2, a silicone coating. The transparent base, mixed with the antistatic agent, sustains its transparency, and with the addition of the clear silicone coating a lubricant sheet transparent as a whole is obtained. The product is suitable for use in transparent cassettes. The incorporation of the antistatic agent slightly affects the properties such as tensile strength of the base unfavorably, but this poses no problem in the employment of the resulting lubricant sheet as such in magnetic tape cassettes. The surface resistivity of the base incorporating an antistatic agent is low enough to prevent positively the discharge noise as the result of electrostatic charging, running troubles, etc. The silicone coating exhibits its excellently low friction characteristic to assure smooth and stable running of the tape and also to restrict the loss of the antistatic agent out of the base for a long period of time. In addition, the provision of the silicone coating on both sides allows either side of the resulting sheet to face the tape, thus settling the above-mentioned problem of the wrong-side contacting due to indistinguishability.

The film materials incorporating an antistatic agent are, for example, polyethylene terephthalate, polycarbonate, polypropylene, polyethylene, and polymethylene terephthalate which were mixed with an anionic, cationic, or non-ionic surface-active agent at the time of film forming. Commercially available are those marketed by Toray Industries, Inc. under the trade designations "X51" and "30". They have surface resistivities of $10^{13}\Omega\cdot cm$ or less.

The release type silicone coating can be prepared, for example, by applying a coating composition, consisting of 0.5–20% of a release type silicone made by Shin-Etsu Chemical Co., 0.5–5% of a curing catalyst such as "Addition type C-PL-4", and 40–50% each of toluene and acetylic ester, to the base in a suitable way, and then curing the coating at about 60°–80° C. for 24–48 hours.

The lubricant sheet according to this invention combines the transparency derived from the use of the clear base and coating materials with the low friction characteristic and the antistatic property to suit the application as such for transparent tape cassette cases. It then offers a number of advantages including the ensurance of stable and smooth running of the tape, long life in contact with the running tape, prevention of shifting of the sheet out of place, and elimination of the possibility of the wrong side of the sheet being exposed for use. Above all, the sheet according to the invention, which retains the antistatic effect for a long period of time, is advantageous in that it avoids the undesirable changes in the running quality and reeled form of the tape and the increase in reeling torque requirement as are the case with conventional tapes. Tests were conducted with the lubricant sheet of the invention and with one prepared, by way of comparison, by applying a silicone coating to one side and an antistatic coating to the other side of a base in order to see how some characteristics or properties of the test sheets undergo changes with use. The results obtained were as follows:

(1) Surface resistivities ($\Omega\cdot cm$)

|  | Initial | 30 passes | 50 passes | 100 passes | 500 passes | 1000 passes |
|---|---|---|---|---|---|---|
| This invention | $1.5 \times 10^{12}$ | $1.3 \times 10^{12}$ | $1.7 \times 10^{12}$ | $2 \times 10^{12}$ | $3.5 \times 10^{12}$ | $3.5 \times 10^{12}$ |
| Comparative | $2 \times 10^{12}$ | $7 \times 10^{12}$ | $5.6 \times 10^{14}$ | $2.3 \times 10^{15}$ | $3 \times 10^{15}$ | $6 \times 10^{15}$ |

It will be seen that the sheet according to the invention retained a surface resistivity of not more than $10^{13}\Omega\cdot cm$ after 1000 passes, whereas the comparative example had a high value of $10^{14}\Omega\cdot cm$ or more after only 50 passes.

(2) Running quality tests (No. of reels which becomes poorly wound No. of reels for running tests)

|  | 30 passes | 50 passes | 100 passes | 200 passes |
|---|---|---|---|---|
| This invention | 0/20 | 0/20 | 0/20 | 0/20 |
| Comparative example | 0/20 | 1/20 | 4/20 | 5/20 |

The tape cassettes that used the lubricant sheet of the invention showed no poorly wound reels after 200 passes and maintained a stable tape running quality for long periods of time.

(3) Reeled forms

|  | 30 passes | 50 passes | 100 passes | 200 passes |
|---|---|---|---|---|
| This invention | Excellent | Excellent | Excellent | Excellent |
| Comparative example | Excellent | Good to fair | Poor | Poor |

The expression "reeled form" as used herein means the outward appearance of a tape wound on a given reel after a predetermined number of passes from reel to reel, in terms of the edgewise alignment of the superposed layers, from the innermost to the outermost, of the reeled tape as inspected visually. The reeled forms were ranked according to the magnitude of edge irregularities that developed on winding, namely, "excellent", "good", "fair", and "poor" in the descending order. The reeled tape in a cassette using the sheet of the invention showed a neatly aligned wound condition after 200 passes.

(4) Reeling torque requirement (g·cm)

|  | Initial | 30 passes | 50 passes | 100 passes | 200 passes | 1000 passes |
|---|---|---|---|---|---|---|
| This invention | 5 | 5 | 6 | 6.5 | 6.5 | 7 |
| Comparative example | 5 | 5.5 | 7 | 7.5 | 10 | 18 |

The reeling torque requirement for the tape increases as the entistatic effect of the lubricant sheet decreases. The test results show that the torque requirement for the tape in the cassette using the sheet of the invention, after 1000 passes, was only 7 g·cm, or less than half that of the comparative example.

We claim:

1. A magnetic tape cassette wherein substantially the entire inside of the cassette is visible from the outside comprising a length of magnetic tape wound on a pair of reels housed in a transparent case formed from an upper half-case and a lower half-case fastened together, and a transparent lubricant sheet comprising a transparent base incorporating an antistatic agent, and a release-type silicone coating adhered to at least one side of said base, said lubricant sheet disposed between said reels and the inner surfaces of said half-cases such that a silicone-coated side of said lubricant sheet faces said reels.

* * * * *